United States Patent
Nirisen et al.

(10) Patent No.: US 8,992,870 B2
(45) Date of Patent: *Mar. 31, 2015

(54) CATALYST FOR DECOMPOSING NITROUS OXIDE AND METHOD FOR PERFORMING PROCESSES COMPRISING FORMATION OF NITROUS OXIDE

(75) Inventors: Øystein Nirisen, Brevik (NO); Klaus Schöffel, Porsgrunn (NO); David Waller, Porsgrunn (NO); Dag Øvrebø, Porsgrunn (NO)

(73) Assignee: Yara International ASA, Oslo (NO)

( * ) Notice: Subject to any disclaimer, the term of this patent is extended or adjusted under 35 U.S.C. 154(b) by 920 days.

This patent is subject to a terminal disclaimer.

(21) Appl. No.: 12/588,722

(22) Filed: Oct. 26, 2009

(65) Prior Publication Data
US 2011/0110835 A9 May 12, 2011

Related U.S. Application Data

(63) Continuation of application No. 10/312,993, filed as application No. PCT/NO01/00283 on Jul. 4, 2001, now Pat. No. 7,700,519.

(30) Foreign Application Priority Data

Jul. 5, 2000 (NO) .................................. 20003467

(51) Int. Cl.
*B01D 53/56* (2006.01)
*B01J 23/83* (2006.01)
(Continued)

(52) U.S. Cl.
CPC ............. *B01J 23/83* (2013.01); *B01D 53/8628* (2013.01); *B01D 53/9427* (2013.01);
(Continued)

(58) Field of Classification Search
USPC ........ 423/235, 239.1; 502/325, 332, 338, 355
See application file for complete search history.

(56) References Cited

U.S. PATENT DOCUMENTS 4,228,138 A  10/1980 Sermon
4,727,052 A * 2/1988 Wan et al. ..................... 502/327
(Continued)

FOREIGN PATENT DOCUMENTS

EP  0562567  9/1993
EP  0718028  6/1996
(Continued)

OTHER PUBLICATIONS

International Search Report mailed Nov. 6, 2001 in International (PCT) Application No. PCT/NO01/00283.
(Continued)

*Primary Examiner* — Paul Wartalowicz
(74) *Attorney, Agent, or Firm* — Wenderoth, Lind & Ponack, L.L.P.

(57) ABSTRACT

The present invention relates to a catalyst comprising 0.1-10 mol % $Co_{3-x}M_xO_4$, where M is Fe or Al and x=0-2, on a cerium oxide support for decomposition of $N_2O$ in gases containing NO. The catalyst may also contain 0.01-2 weight % $ZrO_2$. The invention further comprises a method for performing a process comprising formation of $N_2O$. The $N_2O$ containing gas is brought in contact with a catalyst comprising 0.1-10 mol % $Co_{3-x}M_xO_4$, where M is Fe or Al and x=0-2, on a cerium oxide support, at 250-1000° C. The method may comprise that ammonia is oxidized in presence of an oxidation catalyst and that the thereby formed gas mixture is brought in contact with the catalyst comprising the cobalt component on cerium oxide support at a temperature of 500-1000° C.

15 Claims, 7 Drawing Sheets

(51) Int. Cl.
  *B01D 53/86* (2006.01)
  *B01D 53/94* (2006.01)
  *B01J 23/00* (2006.01)
  *B01J 23/75* (2006.01)

(52) U.S. Cl.
  CPC ............ B01D 2255/2065 (2013.01); *B01D 2255/20746* (2013.01); *B01J 23/002* (2013.01); *B01J 23/75* (2013.01); *B01J 2523/00* (2013.01); *Y02C 20/10* (2013.01); *Y10S 502/524* (2013.01)
  USPC ........ 423/235; 423/239.1; 502/325; 502/332; 502/338; 502/355; 502/524

(56) References Cited

U.S. PATENT DOCUMENTS

| | | |
|---|---|---|
| 4,738,947 A | 4/1988 | Wan et al. |
| 5,075,276 A | 12/1991 | Ozawa et al. |
| 6,153,161 A | 11/2000 | Fetzer et al. |
| 7,700,519 B2 | 4/2010 | Nirisen et al. |

FOREIGN PATENT DOCUMENTS

| | | |
|---|---|---|
| WO | 81/00970 | 9/1981 |
| WO | 96/14153 | 5/1996 |
| WO | 9832524 | 7/1998 |
| WO | 0051715 | 9/2000 |

OTHER PUBLICATIONS

WPI Derwent Abstract, Accession Number 1974-42332V, Week 7423, Abstract of JP 48089185 (Hitachi Maxel Ltd.), Nov. 21, 1973.
Norwegian search report in Application No. 20003467, issued Nov. 1, 2000.
International Preliminary Examination Report dated Oct. 7, 2002 in International (PCT) Application No. PCT/NO01/00283.

\* cited by examiner

CATALYST FOR DECOMPOSING NITROUS OXIDE AND METHOD FOR PERFORMING PROCESSES COMPRISING FORMATION OF NITROUS OXIDE

This application is a continuation of U.S. application Ser. No. 10/312,993, filed Mar. 21, 2003, now U.S. Pat. No. 7,700,519 which is a 371 application of International application No. PCT/NO01/00283, filed Jul. 4, 2001.

The present invention relates to a catalyst for decomposing nitrous oxide ($N_2O$) to nitrogen and oxygen at temperatures of 250-1000° C. The invention also comprises a method for performing processes comprising formation of nitrous oxide.

In recent years there has been increasing focus on how to decompose $N_2O$ as it is an atmospheric ozone depletion gas (greenhouse gas). $N_2O$ will be formed during the catalytic oxidation of ammonia in connection with nitric acid production and during oxidation of alcohols and ketones, for instance in connection with the adipic acid production. Also in connection with the use of $N_2O$, for instance as an anaesthetic gas, the effluent $N_2O$ should not be discharged to the atmosphere, but decomposed.

Though $N_2O$ will decompose homogeneously to some extent at high temperatures, most processes are comprised of the application of various types of catalysts for its decomposition. However, a catalyst which may function well in a certain temperature range and/or gas mixture containing $N_2O$, will not necessarily function for other operating conditions. The selectivity of the catalyst is also of great importance, especially if the catalyst is applied in connection with ammonia oxidation, up front of the absorption unit, in a nitric acid plant. In that case the catalyst should not decompose the main product, i.e. the nitrogen oxide (NO).

Numerous $N_2O$ decomposition catalysts are known and most of these are based on various metal oxides such as cerium oxide, cobalt oxide, cupric oxide, chromium oxide, manganese dioxide and nickel oxide as the active component. Furthermore, there are known catalysts based on metal oxides on zeolite carriers and transition metal ion exchanged zeolites.

A catalyst for reducing nitrogen oxide compounds is known from Japanese application JP 48089185. Though this application does not mention nitrous oxide specifically, its definition also covers this nitrogen oxide. The catalyst contain Co and Ce oxides as its main components. In an example a mixture of 249 parts cobalt acetate, and 315 parts cerium acetate was dissolved in water. $ZrO_2$ was soaked with this solution and pyrolyzed at 900° C. for 5 hours to give a catalyst containing $CeO_2$ and $Co_3O_4$ on the surface of the $ZrO_2$ support.

From the application WO 93/15824 it is known to contact a $N_2O$ containing gas with a catalyst containing nickel oxide plus cobalt oxide on a zirconia substrate at 280° C. The ratio nickel oxide to cobalt oxide is 0.5-1:3-1. Pure and diluted $N_2O$ containing gases can be treated according to this application.

It is further known from EP 207857B1 that a catalyst comprised of ceria and 1-20 weight % of at least Al, Si Zr, Th or rare earth metals as oxides. This composition which essentially contains ceria and preferably 1-5 weight % of said metal oxides can be used for the synthesis of methanol over an extended period without loss of surface area.

From U.S. Pat. No. 4,738,947 it is known that a p-type metal oxide being dispersed on a refactory oxide such as ceria improves the oxidation of hydrocarbons and carbon monooxide. It is further claimed that the dispersion with addition of platinum on the refractory oxide results in a catalyst suitable for a catalytic reduction of nitrogen oxide with hydrocarbons and/or carbon monoxide. No reference is made to a catalytic decomposition of nitrogen oxide without reductants. No example refers to nitrous oxide.

Application WO98/32524 describes an invention related to the catalytic reduction of nitrogen oxide and the use of a catalyst for the reduction of nitrogen oxide and the oxidation of carbon monoxide and hydrocarbons. The essential ingredient is gold which is complexed by a transition metal and anchored to an oxide support. No reference is made to a catalytic decomposition of nitrogen oxide without reductants. No example refers to nitrous oxide.

Applied Catalysis B: Environmental 13 (1977) 69-79 R. S. Drago et al. describes a catalyzed decomposition of $N_2O$ on metal oxide supports. Decomposition of $N_2O$ using metal oxides supported on silica, magnesium oxide, calcium oxide and hydrotalcite-like supports were studied. CoO was found to be a most active catalyst when supported on silica at temperatures of 500° C. The silica supported catalysts were prepared by pore filling the silica support with nitrates of the metals, drying at 180° C. and decomposition of the nitrates to oxides at 500° C.

When supporting CoO on MgO a much more active catalyst was attained. However, the activity of the catalyst decreased by calcination at 1000° C. Catalysts calcined at 500° C. gave 99% conversion of $N_2O$, while catalysts calcined at 1000° C. gave 50% conversion of $N_2O$. Preparation of $Co_3Mg_5Al_2(OH)_2OCO_3 \cdot y.H_2O$ "hydrotalcite-like" compound is also described. This precursor was calcined at 500° C. or 800° C. BET analysis of $Co_2O/2MgO$ catalysts calcined at 500° C. and 1000° C. showed a surface area of 118 $m^2/g$ and 4 $m^2/g$, respectively.

When the catalyst for $N_2O$ decomposition comprises cobalt oxide, as reported in Journal of Chem. Soc. Faraday Trans. 1, 74(7), 1595-603, which studied the structure and activity of $Co_xMg_{1-x}Al_2O$ spinel solid solutions for use as catalysts in decomposing $N_2O$, the catalyst activity generally increases when a greater amount of cobalt ions is incorporated into octahedral sites in the structure.

The main object of the present invention was to arrive at a versatile, active and thermally stable catalyst for decomposing $N_2O$ at temperatures above 250° C., especially at temperatures of 800-1,000° C.

Another object was that the catalyst should be stable and retain its activity for at least a normal cycle, i.e. the length of time between change of the ammonia oxidation catalyst.

A further objective was to produce a catalyst which could be applied at high space velocities and having a high selectivity for decomposing $N_2O$ without decomposing NO.

It was also an objective to arrive at a method for reducing the amount of nitrous oxide from processes comprising formation of nitrous oxide, such as nitric acid processes, adipic acid processes and combustion of hydrocarbons in vehicle engines.

Another object was to remove nitrous oxide from the tail end gas from nitric acid plants and other exhaust gases.

The various known $N_2O$ decomposition catalysts were first evaluated with regard to activity and thermal stability. Cobalt oxide was known from the literature to possess high activity, at least initially for some gas compositions and at relatively low temperatures. $N_2O$ decomposition in the tail end gas from nitric acid plants was reported to perform at high activity by using catalysts prepared from hydrotalcite precursors containing cobalt and being lightly calcined, i.e. at 200-500° C. The inventors therefore started by further investigating this type of catalyst for preparation of a process gas catalyst. An essential requirement for a new catalyst was that it should be thermally stable at ammonia oxidation operating conditions. This means that the catalyst must be active, selective and stable at temperatures of 800-1000° C. and for the gas mixtures formed during the catalytic ammonia oxidation.

Several cobalt oxide containing precursors were then made and calcined for at least 5 hours, at temperatures of about 900° C. Such catalysts were compared with other known catalysts in an initial test of $N_2O$ decomposition for a gas containing 2932 ppm $N_2O$ and 2574 ppm NO and where the ratio NO:$N_2O$ was 0.88 and hourly space velocity, GHSV, was 280,000 $h^{-1}$. The rate constants for the decomposition were measured at 700° C.

These tests confirmed that Co is the essential metal in the Co—Mg—Al (ex-hydrotalcite). The oxides were tested under different GHSV and for the most active oxides with a conversion too high to give accurate rate constants. Tests of the thermal stability of a catalyst based on calcined hydrotalcite containing Co, Mg and Al were performed for 48 hours at about 900° C. The tests were performed at GHSV 108,440 $h^{-1}$ and with 2932 ppm $N_2O$, 2575 ppm NO, the rest of the gas mixture being argon. For these types of catalysts the $N_2O$ conversion and their rate constants were reduced during the test period. The surface area of the catalyst was reduced, from 9.3 down to 1.3 BET $m^2/g$. These results clearly indicate that the stability of such catalysts is questionable.

The inventors then started to investigate catalysts based on active components on a support, for instance metal oxides like zirconia, alumina, ceria and mixtures thereof. One advantage of these types of catalysts will be the material cost reduction if it is possible to substantially reduce the amount of the active component in the decomposition of nitrous oxide.

Firstly, the cobalt-aluminium system was systematically evaluated in laboratory reactor tests. The composition of the system $Co_{3-x}Al_xO_4$ was varied from x=0 to x=2.

The results of laboratory activity data are shown in FIG. 1. It was observed that there is an increase in the activity, measured after approximately 90 hours operation, as aluminium is added to the spinel structure. However, when the cobalt/aluminium ratio was less than 1, a decrease in activity was observed. This was surprising as there is a continuous increase in surface area with increase in the aluminium content. Therefore, in terms of intrinsic reaction rate, it seemed advantageous to work with a cobalt rich spinel though these materials tend to have a low surface area.

Another oxide system which was also thoroughly examined was the $Co_{3-x}Fe_xO_4$ system, x could vary from 0 to 2. These materials were tested in a laboratory microreactor and the results are shown in FIG. 2. $CoFe_2O_4$ showed the highest activity. This particular composition may be described as "cobalt stabilised magnetite".

Although these two types of spinels show high activities, they were not considered practical for use as pure phases in a plant for the following three reasons: Any catalyst containing a high cobalt content will be prohibitively expensive, all the above active phases, except for the aluminium rich spinel, have low surface areas and they also deactivate, even at the relatively low temperature 800° C. Accordingly, these phases can only be considered useful if they can be successfully combined with an appropriate support phase. However, many conventional catalyst supports can not be used for this application. The following properties are required: The support should be a refractory material, preferably with a melting point above 1800° C., so that it resists sintering and maintains a high surface area under the process conditions. Further, the support should not react significantly with the active phase resulting in loss of activity and/or selectivity. Finally, the support should be readily available at a price substantially lower than that of the active phase.

Selection of a suitable support proved to be more complicated than expected and it was soon realised that possible combinations of active phase and support material had to be thoroughly evaluated. The first support material examined was magnesium oxide. A pilot activity test on a cobalt aluminate spinel phase, with a nominal composition of $Co_2AlO_4$ was then performed. It was observed that the initial activity of this catalyst was good. However, during further testing it was found that there was a continuous reduction in performance with time. Detailed analysis of the catalyst after the pilot test indicated that there was transport of cobalt from the spinel active phase into the magnesia support. Further investigations revealed that the aluminium rich spinel and the cobalt-magnesia solid solution exhibit a lower activity than the $Co_2AlO_4$ spinel and this explained the deactivation. This process will continue until the chemical activity of cobalt in the spinel and the magnesia support are the same. Based on these observations and tests magnesia was excluded as a support for the catalyst to be used in a process gas environment.

Another commonly used support material is alumina. However, as with a magnesia support, transport of transition metal from the active phase to the alumina was found to occur, leading to the formation of alumina rich spinels which exhibit a lower intrinsic rate than the cobalt rich spinel or perovskite active phases. Therefore, alumina had to be excluded as a realistic support material. Similar arguments are made against the use of alumino-silicates and alumino-magnesium silicate supports.

Zirconia, ceria and mixtures of these have also been used as support material in some catalysts for oxidation of carbon monoxide and hydrocarbons, (WO 96/14153), the active catalyst being a noble metal and possibly also a transition metal. As referred above cerium oxide is also used in a catalyst for methanol production. This catalyst contains 1-20% of at least Al, Si Zr or Th. In view of the physical properties of ceria it was decided to investigate this support material further. The solubility of cobalt and iron in ceria is low, and the rate of diffusion of these elements into ceria is reported to be very slow, therefore, ceria remained an interesting candidate. Ceria will in most cases be in the form of $CeO_2$, but can also be in the form of $Ce_2O_3$. Laboratory tests with $Co_3O_4/CeO_2$ were then performed and the activity and stability of the catalyst were most promising. Further laboratory tests and pilot plant tests were then performed in order to establish the optimum composition of this type of catalyst.

Pure cerium oxide samples, without an active phase component, was also tested for activity towards $N_2O$ decomposition in the laboratory microreactors under standard test conditions. At a temperature of 890° C., conversion of 70% was achieved, compared with conversions of greater than 95% for the best supported spinel catalysts. These results indicate an additional advantage or synergy of using cerium oxide as a support material. The whole area of the catalyst, both the active phase and the support material will be contributing to the decomposition of the nitrous oxide. Contrary to cerium oxide, other support materials such as alumina and magnesia were found to be completely inert towards nitrous oxide decomposition.

Ceria supported catalysts could be made in several ways using conventional catalyst manufacturing methods. Cobalt salts, cobalt-aluminium-salts and cobalt-iron-salts could be precipitated on or impregnated into cerium oxide powder and the resulting slurry could be dried and calcined. The catalyst particles could then be formed into useful shape by tableting, compacting, extrusion etc. A high surface area of the ceria will be advantageous and as it will be reduced during calcination, a ceria with high initial surface area should be used. At operating temperature the surface area of the ceria should be larger than 10 m$^2$/g, preferably larger than 50 m$^2$/g.

The invention is further explained and elucidated in the following experiments and corresponding tables and figures.

The catalyst according to the invention consists essentially of 0.1-10 mol % Co$_{3-x}$M$_x$O$_4$, where M is Fe or Al and x=0-2, on a cerium oxide support. A preferred catalyst also contains 0.01-2 weight % ZrO$_2$.

The supported catalyst contains preferably 1-5 mol % of the cobalt component.

The cerium oxide support used in the preparation of the catalyst should preferably have a surface area larger than 10 m$^2$/g, preferably larger than 50 m$^2$/g at operating temperature.

Preferred cobalt components in the catalyst are, Co$_3$O$_4$, Co$_{3-x}$Al$_x$O$_3$ where x=0.25-2 or Co$_{3-x}$Fe$_x$O$_4$ where x=0.25-2.

The main feature of the method according to the invention for performing processes comprising formation of N$_2$O is that the N$_2$O containing gas is brought in contact with a catalyst comprising 0.1-10 mol % Co$_{3-x}$M$_x$O$_4$, where M is Fe or Al and x=0-2, on a cerium oxide support, at 250-1000° C. It is preferred to use a catalyst which also contains 0.01-2 weight % ZrO$_2$.

When the method according to the invention is applied in a nitric acid plant, ammonia is oxidised in presence of an oxidation catalyst and then the thereby formed gas mixture is brought in contact with the catalyst comprising the cobalt component on cerium oxide support at a temperature of 500-1000° C.

The tail end gas from an absorption unit downstream an ammonia oxidation unit, can be brought in contact with the N$_2$O decomposition catalyst comprising 0.1-10 mol % Co$_{3-x}$M$_x$O$_4$, where M is Fe or Al and x=0-2, on a cerium oxide support at a temperature of 250-500° C.

The N$_2$O containing gas mixture from an adipic acid process can also be treated according to the invention by bringing the said gas in contact with the N$_2$O decomposing catalyst comprising 0.1-10 mol % Co$_{3-x}$M$_x$O$_4$, where M is Fe or Al and x=0-2, on a cerium oxide support at a temperature of 500-800° C.

EXAMPLE 1

Figure 1:
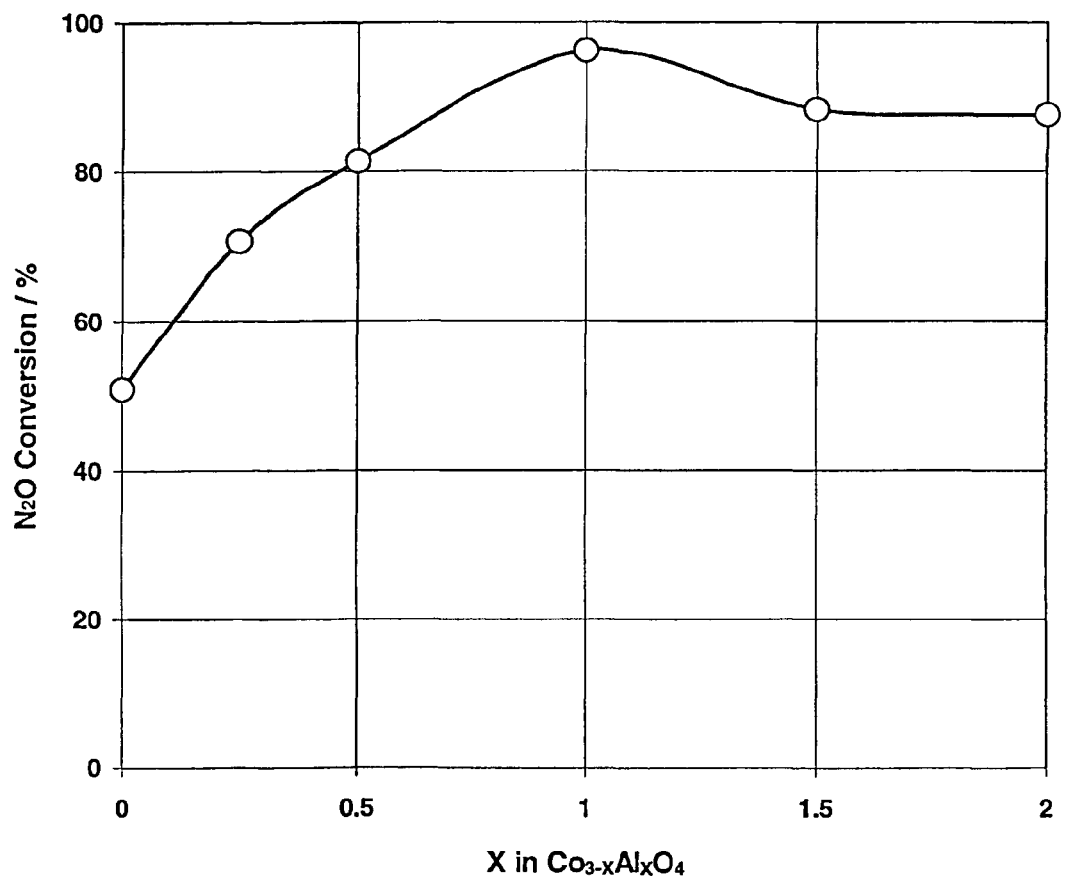
FIG. 1 shows N$_2$O conversion of the Co$_{3-x}$Al$_x$O$_4$ active phases at 890° C. in a laboratory microreactor.
Figure 2:
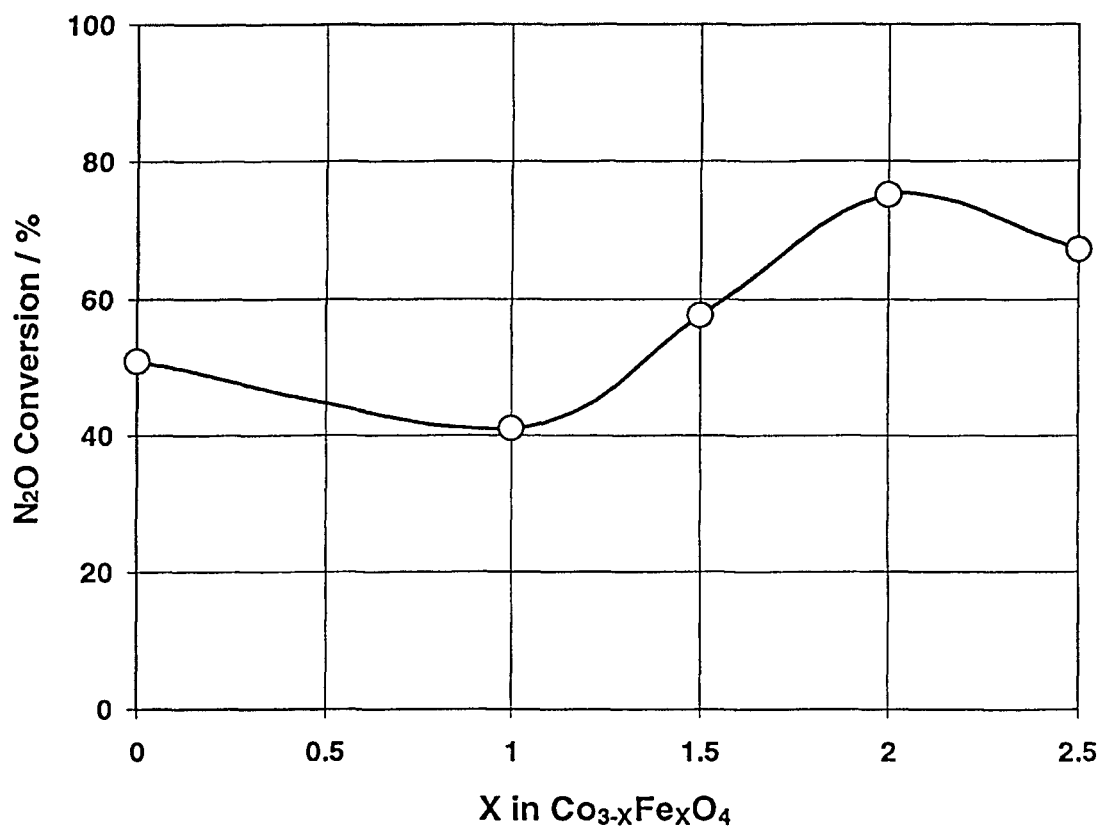
FIG. 2 shows N$_2$O conversion of the Co$_{3-x}$Fe$_x$O$_4$ active phases 890° C. in a laboratory microreactor.
Figure 3:
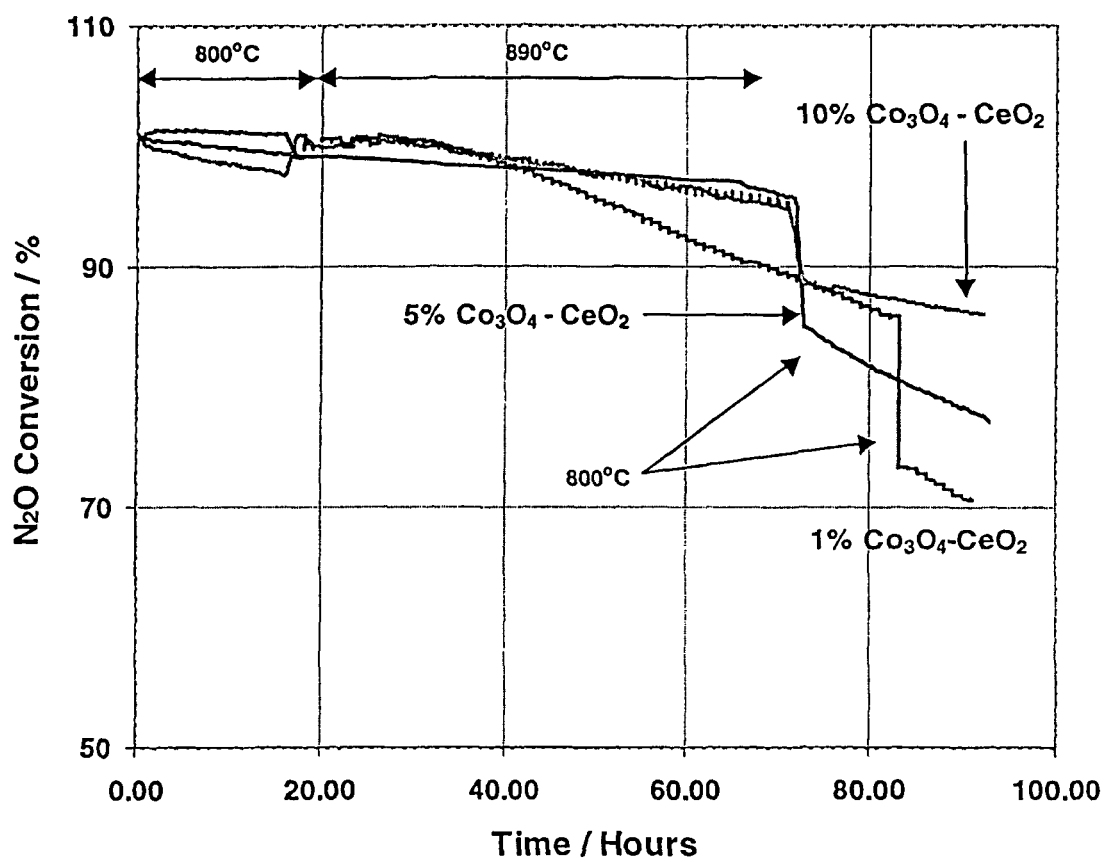
FIG. 3 shows N$_2$O conversion of Co$_3$O$_4$—CeO$_2$ catalysts in a laboratory microreactor.

This example shows the results from tests performed on laboratory scale using catalysts having the respective 1, 5 or 10 mol % concentration of Co$_3$O$_4$ on a ceria support. N$_2$O conversion % as function of time is shown in FIG. 3. The tests were performed at a pressure of 3 bar, GHSV=560,000 h$^{-1}$ and a gas composition of:
N$_2$O=1200 ppm
NO=10000 ppm
Oxygen=4%
H$_2$O=1.7%
the balance being nitrogen.

The tests were performed at 800° C. and 890° C. The results of the tests are shown in FIG. 3. These tests show that the conversion of N$_2$O was very high, about 98%. The stability of the catalyst was also promising. Best results were obtained when the catalyst contained 5 mol % of the cobalt component.

EXAMPLE 2

The catalysts used in the tests of example 1 were then tested in a pilot plant having ammonia oxidation conditions. Further, the tests comprised investigations of unsupported Co$_2$AlO$_4$ catalyst and a catalyst being Co$_2$AlO$_4$ on MgO support The N$_2$O conversion catalyst was placed right below the ammonia oxidation catalyst and platinum recovery gauze's. The tests were performed at the following standard conditions: Pressure 5 bar, temperature 900° C., GHSV 55.000 h$^{-1}$-110,000 h$^{-1}$. The gas composition was:
N$_2$O=1200-1400 ppm, NO=10%, Oxygen=4%, H$_2$O=16% and the balance being nitrogen (plus Ar, CO$_2$, etc. from air).

Figure 4:
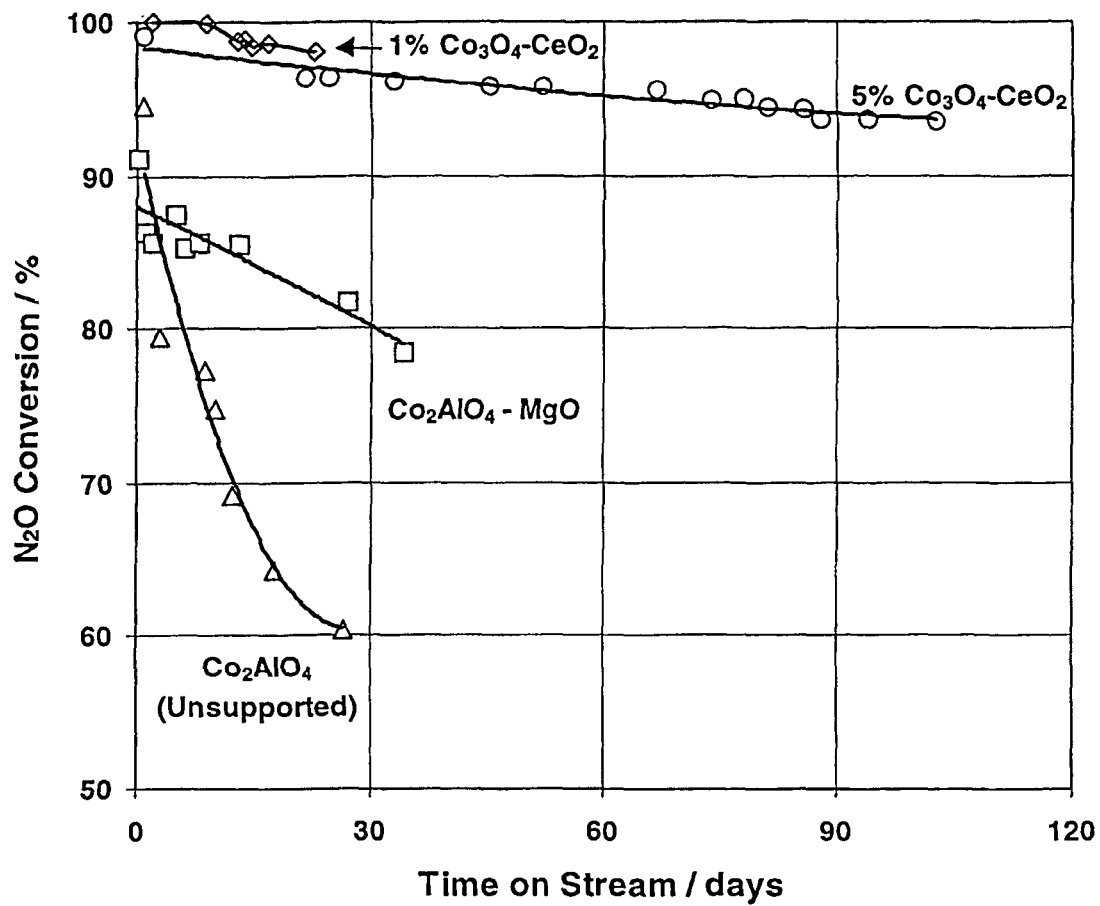
FIG. 4 shows pilot plant activity data for N$_2$O conversion of for various catalysts at 5 bar, 900° C. and GHSV=66,000 h$^{-1}$.

The results of these tests are shown in FIG. 4 and show that for the best catalyst the N$_2$O conversion was about 95% after 100 days on stream. The NO decomposition was well below 0.5% which was considered an acceptable level.

FIG. 4 further shows that the unsupported Co$_2$AlO$_4$ catalyst and the same active phase on MgO both lost most of their activity after a few days of operation.

EXAMPLE 3

Figure 5:
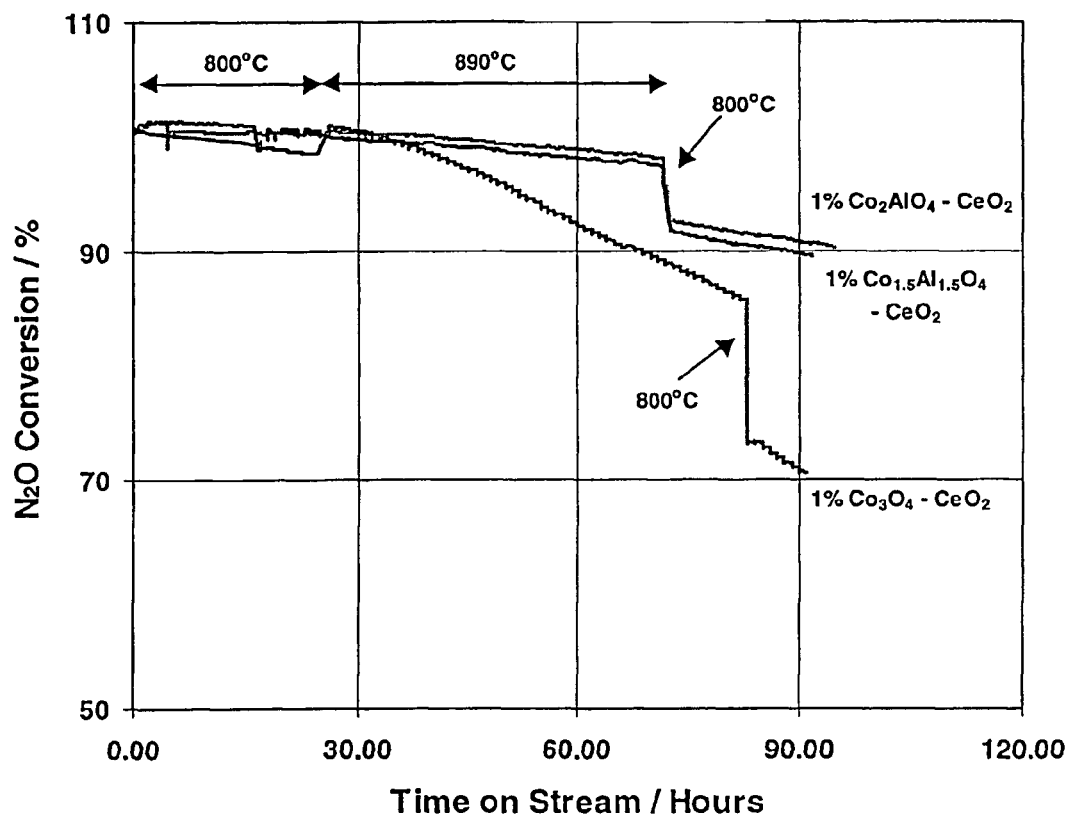
FIG. 5 shows data from a laboratory microreactor for N$_2$O conversion using various catalysts according to the invention.

This example show the results from tests performed for 90 hours in a laboratory microreactor. The operating conditions were as in example 1 and the tests were run at temperatures of 800° C. and 890° C. The results are shown in FIG. 5 which shows that the cobalt aluminate on ceria is a more stable catalyst than cobalt oxide on ceria.

EXAMPLE 4

Figure 6:
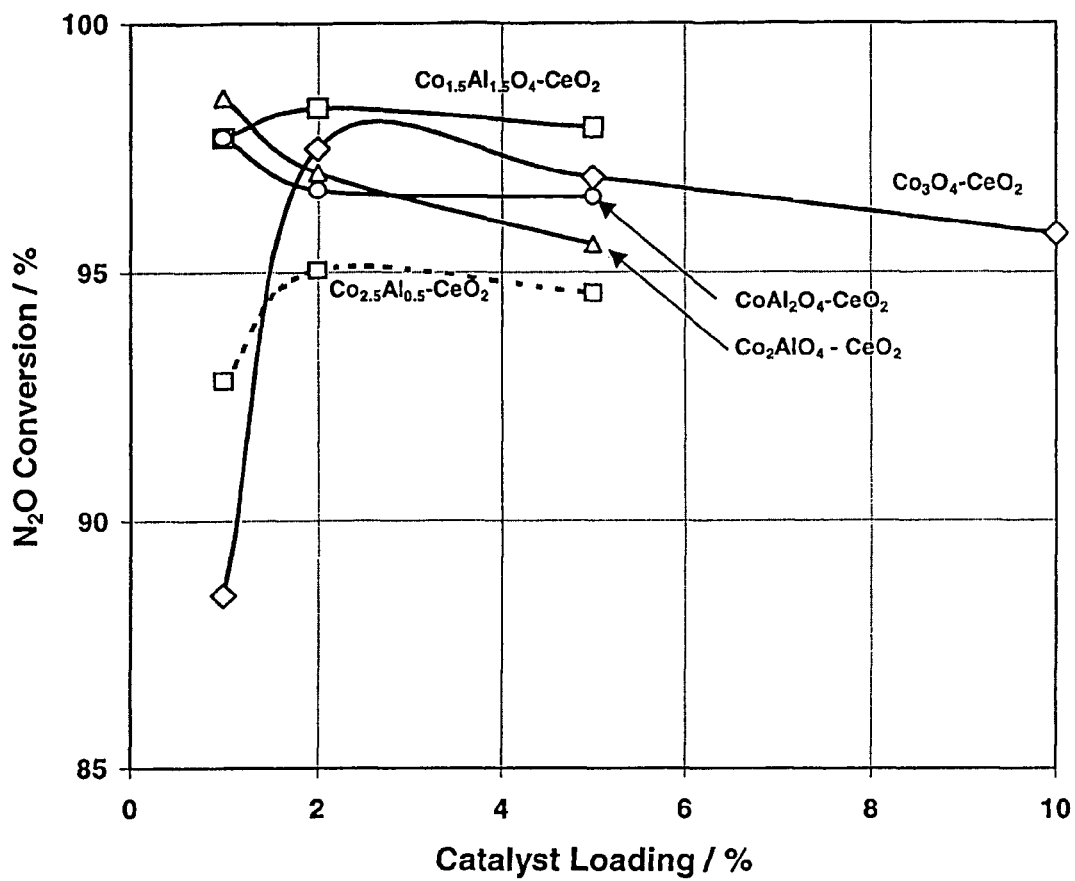
FIG. 6 shows effect of catalyst composition on loading on N$_2$O conversion in a laboratory microreactor.

This example shows the effect on catalyst composition and loading on N$_2$O conversion in a laboratory reactor. The operating conditions were as in Example 1. The tests were run at 890° C. For all the catalysts according to the invention the best results are obtained at a catalyst loading of about 2 mol %, but for some high activity is achieved already at very low loading as illustrated in FIG. 6. N$_2$O conversion of more than 95% can be obtained at very low catalyst loading and even at as much as 10 mol %, but nothing seems to be gained by increasing the catalyst loading above 5 mol %. The catalyst loading will accordingly also depend on practical and economical evaluations.

EXAMPLE 5

Figure 7:
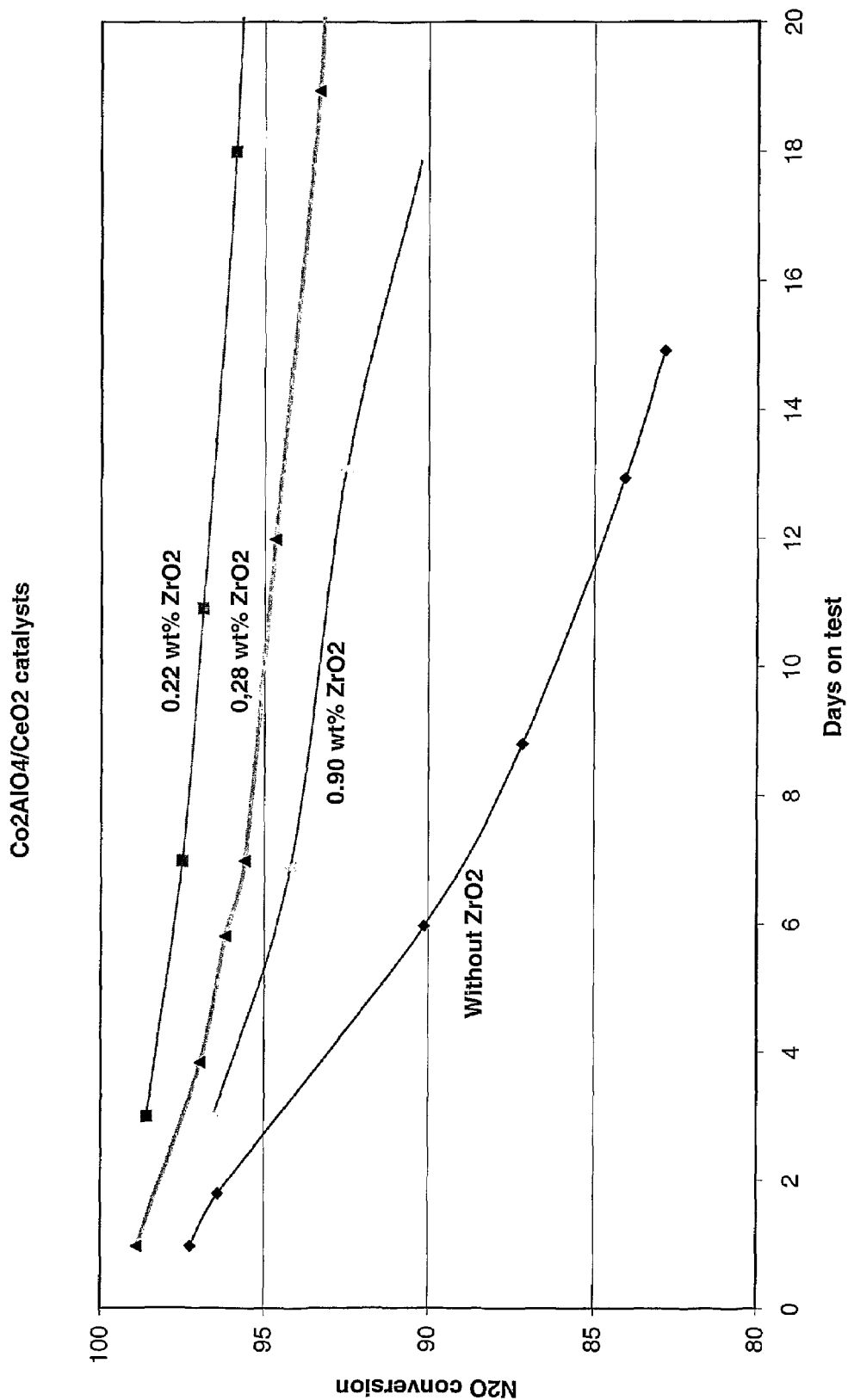
FIG. 7 shows the effect on N$_2$O conversion of the addition of ZrO$_2$ to the Co$_2$ALO$_4$/CEO$_2$ catalyst.

This example shows the effect of ZrO$_2$ addition to the performance of the CO$_2$AlO$_4$/CeO$_2$ catalyst installed in an ammonia oxidation pilot plant. The catalyst was prepared by mixing the ingredients as in previous examples plus adding 0.01 weight %-2 weight % fine ZrO$_2$ powder (particle size 1-3 µm). The tests were performed under the same standard conditions as for Example 2. In FIG. 7 the results are presented for an addition of 0.22, 0.28 and 0.90 weight % ZrO$_2$ compared to catalysts without ZrO$_2$. The optimum concentration in this case was 0.2 weight %. The effect of adding $ZrO_2$ is reduced degradation of catalyst activity over time.

The inventors have by the present invention succeeded in arriving at a versatile, active and thermally stable $N_2O$ decomposition catalyst. The catalysts according to the invention can be applied at a wide temperature range and will also be stable at varying gas composition. Presence of water, which often is a problem, for instance in connection with catalyst for exhaust from car engines, have been found to be no serious problem for these catalysts. Accordingly, the new catalysts can be applied for decomposing $N_2O$ from processes comprising formation of $N_2O$. The catalysts are especially useful in connection with nitric acid production as the $N_2O$ can be decomposed in the process gas formed after ammonia oxidation without significant destruction of NO and also be used in the tail gas from the subsequent absorber unit.

The invention claimed is:

1. A catalyst for the decomposition of $N_2O$ at temperatures of 250-1000° C.,
    wherein the catalyst comprises 0.1-10 mol % $Co_{3-x}Al_xO_4$, where $0.25 \leq x < 2$, on a cerium oxide support,
    wherein the catalyst decomposes $N_2O$, and
    wherein the catalyst has a high selectivity for decomposing $N_2O$ without significant destruction of NO.

2. The catalyst according to claim 1,
    wherein the catalyst contains 1-5 mol % of $Co_{3-x}Al_xO_4$.

3. The catalyst according to claim 2, wherein the catalyst further comprises 0.01-2 weight % $ZrO_2$.

4. The catalyst according to claim 1,
    wherein the surface area of the cerium oxide support is larger than 10 $m^2/g$ at operating temperature.

5. The catalyst according to claim 4, wherein the catalyst further comprises 0.01-2 weight % $ZrO_2$.

6. The catalyst according to claim 4, wherein the surface area of the cerium oxide support is larger than 50 $m^2/g$.

7. The catalyst according to claim 1, wherein the catalyst further comprises 0.01-2 weight % $ZrO_2$.

8. A method for decomposing $N_2O$, without significant destruction of NO, comprising contacting an $N_2O$ containing gas with the catalyst according to claim 1, at a temperature in the range of 250-1000° C., in an oxidizing environment.

9. The method according to claim 8,
    wherein the catalyst further comprises 0.01-2 weight % $ZrO_2$.

10. The method according to claim 9, comprising oxidizing ammonia in the presence of an oxidation catalyst and
    contacting the thereby formed gas mixture with the catalyst at a temperature in the range of 500-1000° C.

11. The method according to claim 9, comprising contacting a tail end gas from an absorption unit downstream an ammonia oxidation unit with the catalyst at a temperature in the range of 250-500° C.

12. The method according to claim 9, comprising contacting an $N_2O$ containing gas mixture from an adipic acid process with the catalyst at a temperature in the range of 500-800° C.

13. The method according to claim 8, comprising oxidizing ammonia in the presence of an oxidation catalyst and
    contacting the thereby formed gas mixture with the catalyst at a temperature in the range of 500-1000° C.

14. The method according to claim 8, comprising contacting a tail end gas from an absorption unit downstream an ammonia oxidation unit with the catalyst at a temperature in the range of 250-500° C.

15. The method according to claim 8, comprising contacting an $N_2O$ containing gas mixture from an adipic acid process with the catalyst at a temperature in the range of 500-800° C.

* * * * *